US012685338B2

(12) United States Patent
Emmett et al.

(10) Patent No.: US 12,685,338 B2
(45) Date of Patent: Jul. 21, 2026

(54) HEATER ASSEMBLY TO PROVIDE A TEMPERATURE GRADIENT

(71) Applicant: Philip Morris Products S.A., Neuchatel (CH)

(72) Inventors: Robert Emmett, Neuchatel (CH); Eva Saade Latorre, Colombier (CH)

(73) Assignee: Philip Morris Products S.A., Neuchatel (CH)

(*) Notice: Subject to any disclaimer, the term of this patent is extended or adjusted under 35 U.S.C. 154(b) by 411 days.

(21) Appl. No.: 18/257,652

(22) PCT Filed: Dec. 13, 2021

(86) PCT No.: PCT/EP2021/085517
§ 371 (c)(1),
(2) Date: Jun. 15, 2023

(87) PCT Pub. No.: WO2022/136004
PCT Pub. Date: Jun. 30, 2022

(65) Prior Publication Data

US 2024/0122244 A1 Apr. 18, 2024

(30) Foreign Application Priority Data

Dec. 22, 2020 (EP) .................................... 20216465

(51) Int. Cl.
*A24F 40/46* (2020.01)
*A24F 40/10* (2020.01)
(Continued)

(52) U.S. Cl.
CPC .............. *A24F 40/46* (2020.01); *A24F 40/10* (2020.01); *A24F 40/40* (2020.01); *A24F 40/44* (2020.01); *H05B 3/34* (2013.01); *A24F 40/50* (2020.01)

(58) Field of Classification Search
CPC ........... A24F 40/46; A24F 40/10; A24F 40/44
See application file for complete search history.

(56) References Cited

U.S. PATENT DOCUMENTS

| | | | | |
|---|---|---|---|---|
| 9,955,731 | B2 | 5/2018 | Liu | |
| 2013/0081623 | A1* | 4/2013 | Buchberger | A61M 15/00 128/203.27 |

(Continued)

FOREIGN PATENT DOCUMENTS

| | | | |
|---|---|---|---|
| CN | 102883766 | A | 1/2013 |
| CN | 106723372 | A | 5/2017 |

(Continued)

OTHER PUBLICATIONS

Combined Russian Office Action and Search Report issued May 7, 2025 in Russian Patent Application No. 2023118937/03 (with English Translation of Office Action only), 9 pages.

(Continued)

*Primary Examiner* — Michael H. Wilson
*Assistant Examiner* — Michael Patrick Mullen
(74) *Attorney, Agent, or Firm* — Oblon, McClelland, Maier & Neustadt, L.L.P.

(57) ABSTRACT

A heater assembly for an aerosol-generating system is provided, the heater assembly including: a liquid aerosol-forming substrate including at least two compounds, the first compound having a first boiling point and the second compound having a second boiling point; a retention material containing the liquid aerosol-forming substrate; and a heating element configured to heat the retention material by passing a current along a length of the heating element, the heating element being formed from a band of material, and a cross-sectional area of the band of material progressively decreasing along a length of the band of material from a maximum cross-sectional area of the band of material at a first end of the band of material to a minimum cross- (Continued)

sectional area of the band of material at a second end of the band of material, to provide a temperature gradient along a surface of the retention material.

15 Claims, 3 Drawing Sheets

(51) Int. Cl.

| | |
|---|---|
| ***A24F 40/40*** | (2020.01) |
| ***A24F 40/44*** | (2020.01) |
| ***H05B 3/34*** | (2006.01) |
| *A24F 40/50* | (2020.01) |

(56) References Cited

U.S. PATENT DOCUMENTS

| | | | | |
|---|---|---|---|---|
| 2015/0305408 | A1 | 10/2015 | Liu | |
| 2016/0309785 | A1 | 10/2016 | Holtz | |
| 2018/0168225 | A1 | 6/2018 | Zinovik et al. | |
| 2019/0027774 | A1* | 1/2019 | Hussaini | H01M 8/1246 |
| 2019/0124993 | A1 | 5/2019 | Matsumoto et al. | |
| 2020/0260787 | A1 | 8/2020 | Zinovik et al. | |
| 2020/0367564 | A1 | 11/2020 | Li et al. | |
| 2021/0030073 | A1 | 2/2021 | Yang et al. | |
| 2021/0045441 | A1 | 2/2021 | Zinovik et al. | |
| 2021/0352967 | A1 | 11/2021 | Zinovik et al. | |

FOREIGN PATENT DOCUMENTS

| | | | |
|---|---|---|---|
| CN | 109688643 | A | 4/2019 |
| CN | 110213972 | A | 9/2019 |
| CN | 110279162 | A | 9/2019 |
| EP | 1 348 446 | A1 | 10/2003 |
| EP | 3 319 464 | A0 | 5/2018 |
| EP | 3 476 229 | A1 | 5/2019 |
| EP | 3 771 353 | A1 | 2/2021 |
| JP | 2018-523990 | A | 8/2018 |
| KR | 20100087461 | A | 8/2010 |
| KR | 10-2019-0141012 | | 12/2019 |
| RU | 2 638 514 | C2 | 12/2017 |
| WO | WO 2011/109849 | A1 | 9/2011 |
| WO | WO 2016/135342 | | 9/2016 |
| WO | WO 2017/005471 | A1 | 1/2017 |
| WO | WO 2017/161725 | A1 | 9/2017 |
| WO | WO 2019/157645 | A1 | 8/2019 |
| WO | WO 2019/157647 | A1 | 8/2019 |

OTHER PUBLICATIONS

Extended European Search Report issued Jul. 2, 2021 in European Patent Application No. 20216465.3, 7 pages.

International Search Report & Written Opinion issued Apr. 8, 2022 in PCT/EP2021/085517 filed on Dec. 13, 2021, 10 pages.

Japanese Office Action issued Dec. 25, 2025, in JP Application No. 2023-536378.

Office Action dated Mar. 12, 2026 issued in corresponding Chinese Patent Application No. 202180081681.7 (with English translation).

Office Action dated May 4, 2026 issued in corresponding Korean Patent Application No. 10-2023-7024559 (with English translation) (citing documents 1-2).

* cited by examiner

HEATER ASSEMBLY TO PROVIDE A TEMPERATURE GRADIENT

The present disclosure relates to a heater assembly. In particular, the present disclosure relates to a heater assembly for use in an aerosol-generating system. The present disclosure also relates a cartridge comprising the heater assembly, an aerosol-generating system comprising the heater assembly and a method for heating a liquid aerosol-forming substrate within the heater assembly.

In many known aerosol-generating systems, a liquid aerosol-forming substrate is heated and vaporised to form a vapour. The vapour cools and condenses to form an aerosol. In some aerosol-generating systems, such as electrically heated smoking systems, this aerosol is then inhaled by a user.

Typically, the liquid aerosol-forming substrate comprises several compounds which are vaporised when heated. These compounds may have different boiling points. For example, a liquid aerosol-forming substrate may comprise nicotine (with a boiling point of around 247 degrees Celsius at atmospheric pressure) and glycerol (with a boiling point of around 290 degrees Celsius at atmospheric pressure).

When a liquid aerosol-forming substrate comprising compounds having different boiling points is heated, compounds with lower boiling points may be vaporised before compounds with higher boiling points. Alternatively, or in addition, compounds with lower boiling points may be vaporised at a higher rate than compounds with higher boiling points.

This may be undesirable because interactions and combinations between different compounds may be limited. For example, a liquid aerosol-forming substrate may comprise a nicotine compound and an organic acid compound, these compounds having different boiling points. Both of these compounds may be vaporised. The nicotine in the liquid aerosol-forming substrate may form free base nicotine when it is vaporised. However, it may be desirable to generate an aerosol with nicotine salt rather than free base nicotine. In order to form this nicotine salt, the free base nicotine may be protonated by the vaporised organic acid. However, this protonation may be limited if the organic acid is not vaporised until after nicotine has vaporised, or is vaporised more slowly than is required to protonate a suitable proportion of the free base nicotine.

Further, vaporising some compounds of an aerosol-forming substrate at a higher rate than others may undesirably cause the properties of the aerosol generated to change over time, for example over the course of a puff on an aerosol-generating system. This may be because, towards the beginning of a puff, when a heating element is activated and rises in temperature, liquid aerosol-forming substrate close to the heating element may reach a first temperature at which a first compound with a lower boiling point is vaporised but a second compound with a higher boiling point is not vaporised. Then, later in the puff, liquid aerosol-forming substrate close to the heating element may reach a second temperature at which the second compound with the higher boiling point is vaporised. However, by this point, much of the first compound in the liquid aerosol-forming substrate close to the heating element may have already been vaporised. Thus, towards the start of a puff, the aerosol generated may comprise a larger proportion of the first compound and, later in the puff, the aerosol generated may comprise a larger proportion of the second compound.

Alternatively, or in addition, the properties of the aerosol generated may change over the course of several puffs. This may occur where compounds of the liquid aerosol-forming substrate are not vaporised at an appropriate rate. For example, a liquid aerosol-forming substrate may comprise X percent by mass of a first compound and Y percent by mass of a second compound. If the liquid aerosol-forming substrate is not vaporised to produce a vapour comprising a mass ratio of the first compound to the second compound of X to Y, then the composition of the liquid aerosol-forming substrate may change as vapour is generated. This may, in turn, lead to a change in the properties of the aerosol generated by the liquid aerosol-forming substrate.

It is an aim of the invention to control the vaporisation of various compounds of a liquid aerosol-forming substrate, where these compounds have different boiling points.

According to an aspect of the present disclosure, there is provided a heater assembly for use in an aerosol-generating system, the heater assembly may comprise a liquid aerosol-forming substrate. The liquid aerosol-forming substrate may comprise at least two compounds, wherein the first compound has a first boiling point and the second compound has a second boiling point. The heater assembly may comprise a retention material containing the liquid aerosol-forming substrate. The heater assembly may comprise a heating element configured to heat the retention material by passing a current along the length of the heating element. The heating element may be formed from a band of material, wherein the cross-sectional area of the band of material progressively decreases along a length of the band of material to provide a temperature gradient along a surface of the retention material.

The cross-sectional area of the band of material may progressively decrease along a length of the band of material from a maximum cross-sectional area of the band of material at a first end of the band of material to a minimum cross-sectional area of the band of material at a second end of the band of material.

The heater assembly may provide areas along a surface of the retention material which increase in temperature at a greater rate, and areas which increase in temperature at a lesser rate.

Advantageously, the heater assembly may improve control of the vaporisation of the different compounds of the liquid aerosol-forming substrate. The heater assembly may result in liquid aerosol-forming substrate compounds with higher boiling points and lower boiling points being vaporised simultaneously at desirable rates. The heater assembly may result in liquid aerosol-forming substrate compounds with higher boiling points and lower boiling points being vaporised in more preferable proportions. The heater assembly may provide generation of an aerosol with a more desirable composition. The heater assembly may provide more consistent generation of an aerosol with desirable properties.

The band of material may have a progressively decreasing cross-sectional area along a length of the band of material. The width of the band of material may be progressively decreasing along a length of the band of material. Alternatively, or in addition, the thickness of the band of material may be progressively decreasing, along a length of the band of material.

The band of material may be folded on itself to provide at least one overlapping portion having a greater thickness and a lower electrical resistance than adjacent non-overlapping portions of the band of material.

The at least one overlapping portion may provide a portion of heating element with a lower temperature than adjacent non-overlapping portions of the band of material. The band of material may be folded on itself any number of times along a length of the band of material. For example, the band of material may be folded on itself to provide one, two, three, four, five, six, seven, eight, nine or 10 overlapping portions along a length of the band of material.

Advantageously, the band of material being folded on itself and the resulting at least one overlapping portion may create more areas of higher temperature, and more areas of lower temperature, along a surface of the retention material. Alternatively, or in addition, this may provide more areas which increase in temperature at a greater rate, and more areas which increase in temperature at a lesser rate, along a surface of the retention material. This may lead to liquid aerosol-forming substrate compounds with higher boiling points and lower boiling points being vaporised simultaneously at preferable rates. Advantageously, the production of a heating element formed from of a band of material that is folded on itself may require a simple manufacturing process.

The heating element may comprise more than one material. The heating element may comprise a first heating element material and a second heating element material. The second heating element material may be different to the first heating element material. The first heating element material may be at a first position along a length of the band of material. The second heating element material may be at a second position along a length of the band of material. The first heating element material may have a first electrical resistivity and the second heating element material may have a second electrical resistivity, different to the first electrical resistivity.

Advantageously, a heating element that comprises more than one material may provide an increased temperature gradient along a surface of the retention material. The increased temperature gradient may provide more areas which increase in temperature at a greater rate, and more areas which increase in temperature at a lesser rate, along a surface of the retention material. The increased temperature gradient may further affect the rate of vaporisation of the different compounds within the liquid aerosol-forming substrate. As explained above, this may lead to generation of an aerosol with a more desirable composition. Alternatively, or in addition, a heating element that comprises more than one material provide more consistent generation of an aerosol with desirable properties.

The heating element, or portions thereof, may comprise or be formed from any material with suitable electrical and mechanical properties, for example a suitable, electrically resistive material. Suitable materials include but are not limited to: semiconductors such as doped ceramics, electrically "conductive" ceramics (such as, for example, molybdenum disilicide), carbon, graphite, metals, metal alloys and composite materials made of a ceramic material and a metallic material. Such composite materials may comprise doped or undoped ceramics. Examples of suitable doped ceramics include doped silicon carbides. Examples of suitable metals include titanium, zirconium, tantalum and metals from the platinum group. Examples of suitable metal alloys include stainless steel, Constantan, nickel-, cobalt-, chromium-, aluminium-, titanium-, zirconium-, hafnium-, niobium-, molybdenum-, tantalum-, tungsten-, tin-, gallium-, manganese- and iron-containing alloys, and super-alloys based on nickel, iron, cobalt, stainless steel, Timetal®, iron-aluminium based alloys and iron-manganese-aluminium based alloys. Timetal® is a registered trade mark of Titanium Metals Corporation, 1999 Broadway Suite 4300, Denver Colorado. In composite materials, the electrically resistive material may optionally be embedded in, encapsulated or coated with an insulating material or vice-versa, depending on the kinetics of energy transfer and the external physicochemical properties required. The heating element, or portions thereof, may comprise a metallic etched foil insulated between two layers of an inert material. In that case, the inert material may comprise Kapton®, all-polyimide or mica foil. Kapton® is a registered trade mark of E.I. du Pont de Nemours and Company, 1007 Market Street, Wilmington, Delaware 19898, United States of America.

The heater assembly may comprise a plurality of heating elements. Preferably, wherein at least one heating element provides a temperature gradient along a surface of the retention material. Preferably, a section of the retention material is enclosed, or partially enclosed in a volume defined between two heating elements. Features described in relation to the first heating element may be applied to any of the plurality of heating elements.

An enclosed or partially enclosed volume defined between two heating elements may provide a temperature gradient along a surface of the retention material.

The positioning of the plurality of heating elements may be used to increase the temperature gradient along a surface of the retention material. Advantageously, identical bands of material may be manufactured for various heater assemblies comprising a plurality of heating elements, where different temperatures or temperature gradients may be achieved by rearrangement of the heating elements. For example, a first heater assembly comprising two identical bands of material may have a greater temperature gradient than a second heater assembly comprising another two identical bands of material. The first heater assembly may have the bands of material positioned such that the portions of the bands of material with the substantially smallest cross-sectional areas are arranged closer together than the portions of the bands of material with the substantially largest cross-sectional areas. This may create a greater temperature gradient along a surface of the retention material than in the second heater assembly if the second heater assembly comprises identical bands of material a uniform distance apart. Therefore, the first heater assembly may simultaneously vaporise liquid aerosol-forming substrate compounds with higher boiling points, and lower boiling points, in more different proportions.

The heating element may be in contact with the retention material. The heating element may be on a surface of the retention material. The heating element may be embedded or partially embedded in the retention material.

As explained above, the positioning of the heating element or plurality of heating elements may be used to increase the temperature gradient along a surface of the retention material. This may lead to liquid aerosol-forming substrate compounds with higher boiling points and lower boiling points being vaporised simultaneously at desirable rates.

The heating element may be configured to be resistively heated. The band of material may be perforated or a mesh.

Advantageously, a heating element comprising a mesh or perforated band of material may provide a large surface area. This large surface area may provide efficient vaporisation of liquid aerosol-forming substrate.

The heater assembly may comprise a reservoir for storing aerosol-forming substrate. The heater assembly may comprise a reservoir of liquid aerosol-forming substrate. The term "reservoir", unless explicitly stated otherwise, may be used to refer to a reservoir for storing liquid aerosol-forming substrate or a reservoir of liquid aerosol-forming substrate. The reservoir may be configured to store, or may store, at least 0.2, 0.5, or 1 ml of liquid aerosol-forming substrate.

The reservoir may be configured to store, or may store, less than 2, 1.8, or 1.5 ml of liquid aerosol-forming substrate.

The retention material may be a porous material. The retention material may be a ceramic material. Preferably, the retention material is a capillary retention material. The liquid aerosol-forming substrate storage component may store, or be configured to store, liquid aerosol-forming substrate.

The retention material may be in fluid communication with the reservoir. In this case, in use, sections of the heating element which are further from the reservoir of liquid aerosol-forming substrate, or areas in the retention material around these sections of the heating element, may reach higher temperatures than sections or areas which are closer to the reservoir of liquid aerosol-forming substrate. This is because more heat may be transferred, or heat may be transferred at a higher rate, from the heating element to the reservoir of liquid aerosol-forming substrate for sections of the heating element which are closer to the reservoir of liquid aerosol-forming substrate.

The retention material may comprise, or may be, a material soaked with, or a material configured to be soaked with, liquid aerosol-forming substrate. The retention material may have a fibrous or spongy structure. The retention material may comprise a capillary material. The retention material may comprise a bundle of capillaries. For example, the retention material may comprise one or more of fibres, threads, and fine bore tubes.

The retention material may comprise sponge-like or foam-like material. The structure of the retention material may form a plurality of small bores or tubes, through which the liquid can be transported by capillary action.

The retention material may comprise any suitable material or combination of materials. Suitable materials include but are not limited to: a sponge or foam material, ceramic- or graphite-based materials in the form of fibres or sintered powders, foamed metal or plastics material, a fibrous material, for example made of spun or extruded fibres, such as cellulose acetate, polyester, or bonded polyolefin, polyethylene, terylene or polypropylene fibres, nylon fibres or ceramic. The retention material may have any suitable capillarity and porosity so as to be used with different liquid aerosol-forming substrates having different physical properties.

The aerosol-forming substrate is preferably absorbed in the retention material. The retention material may be configured to store, or may store, at least 0.02, 0.05, 0.1, 0.2, or 0.5 ml of liquid aerosol-forming substrate.

The heating element or heating elements may be configured to be heated, and may, in use, be heated, to at least 50, 100, 150, 200, 250, 300, 350, or 400 degrees Celsius. In use, the fifth portion of the heating element may be heated to at least 50, 100, 150, 200, 250, 300, 350, or 400 degrees Celsius.

The minimum cross-sectional area of the heating element along a length of the band of material may be at least 50 percent of the maximum cross-sectional area of the heating element along the length of the band of material.

Advantageously, this may provide a predictable temperature difference along the length of the band of material. It may therefore provide a predictable temperature gradient along a surface of the retention material.

The boiling point of the first compound may be between 240 degrees Celsius and 250 degrees Celsius. The boiling point of the first compound may be 247 degrees Celsius. The boiling point of the second compound may be between 285 degrees Celsius and 295 degrees Celsius. The boiling point of the second compound may be 290 degrees Celsius. The first compound may be nicotine and the second compound may be glycerol. The temperature gradient along a surface of the retention material may be between 247 degrees Celsius and 290 degrees Celsius. This may produce vaporise compounds of nicotine and glycerol in preferable proportions.

According to another aspect of the present disclosure, there is provided a cartridge for use in an aerosol-generating system, the cartridge may comprise the heater assembly of the present disclosure.

The cartridge preferably comprises an air inlet and an air outlet, wherein an air flow path may be defined between the air inlet and the air outlet. The heating element may be disposed downstream of the air inlet. The heating element may be disposed upstream of the air outlet. Air drawn from the air inlet to the air outlet may flow across, past, or through the heating element.

Advantageously, providing an air flow across, past, or through the heater assembly or heating element may allow for entrainment of vapour formed by the heater assembly in the air flow.

The air inlet may be located closest to the portion of heating element with the substantially lowest electrical resistance. The air outlet may be located closest to the portion of heating element with the substantially highest electrical resistance.

In use, air entering the air inlet may be at atmospheric temperature. Advantageously, locating the air inlet closest to the portion of heating element with the substantially lowest electrical resistance and locating the air outlet closest to the portion of heating element with the substantially highest electrical resistance may increase the temperature gradient along the surface of the retention material. Advantageously, as explained previously, this may produce a consistent aerosol with a desirable composition. Alternatively, or in addition, this location of the air inlet and air outlet may provide a predictable variation of temperature of air within the aerosol-generating system and therefore the heater assembly may be maintained a desirable heterogeneous temperature.

The air in the air flow path preferably passes across a surface of the retention material. Preferably, the heater assembly provides a temperature gradient along the surface of the retention material.

In use, this may increase the temperature of the air flow at the air outlet. Some users may prefer this. This may more accurately mimic the experience of smoking a conventional cigarette or cigar.

The cartridge may be configured to engage with, and disengage from, an aerosol-generating device. The aerosol-generating device may comprise a power source. The power source may be configured to supply power to the heating element. The power source may be configured to supply power to the heating element only when the cartridge is engaged with the aerosol-generating device.

The cartridge may comprise a mouthpiece. The mouthpiece may comprise the air outlet. In use, when the cartridge is engaged with an aerosol-generating device, a user may puff on the mouthpiece of the cartridge. This may cause air to flow in through the air inlet, then across, over, past, or through the heater assembly or heating element, then through the air outlet.

The cartridge may comprise first and second electrical contacts electrically connected to the heating element. The electrical contacts may comprise one or more of tin, silver, gold, copper, aluminium, steel such as stainless steel, phosphor bronze, tin alloyed with antimony, tin alloyed with zirconium, tin alloyed with bismuth, or tin alloyed with other components improving resistance to organic acids.

The electrical contacts may be configured to form an electrical connection with corresponding electrical contacts on an aerosol-generating device when the cartridge is engaged with the aerosol-generating device.

The heating element may be located in an air flow path between the air inlet of the cartridge and the air outlet of the cartridge.

According to another aspect of the present disclosure, there is provided an aerosol-generating system. The aerosol-generating system may comprise the heater assembly of the present disclosure.

The aerosol-generating system preferably comprises an air inlet and an air outlet, wherein an air flow path may be defined between the air inlet and the air outlet. The air drawn from the air inlet to the air outlet preferably flows across, past, or through the heating element. The air inlet may be located closest to the portion of heating element with the substantially lowest electrical resistance. The air outlet may be located closest to the portion of heating element with the substantially highest electrical resistance. The air in the airflow path preferably passes across a surface of the retention material and the air flow path is in fluid contact with the aerosol-forming substrate. Preferably, the heater assembly provides a temperature gradient across the surface of the retention material.

Advantageously, the aerosol-generating system may improve control of the vaporisation of the different compounds of the liquid aerosol-forming substrate. The aerosol-generating system may result in liquid aerosol-forming substrate compounds with higher boiling points and lower boiling points being vaporised simultaneously at desirable rates. The aerosol-generating system may result in liquid aerosol-forming substrate compounds with higher boiling points and lower boiling points being vaporised in more preferable proportions. The aerosol-generating system may provide generation of an aerosol with a more desirable composition. The aerosol-generating system may provide more consistent generation of an aerosol with desirable properties.

The aerosol-generating system may comprise a mouthpiece at the air outlet. The aerosol-generating system may be an e-cigarette system.

The aerosol-generating system may comprise a cartridge according to the present disclosure.

The system may comprise an aerosol-generating device. The system may comprise a cartridge comprising the heater assembly.

The cartridge may be configured to engage with the aerosol-generating device. The cartridge may be configured to disengage from the aerosol-generating device.

The aerosol-generating system, for example the aerosol-generating device of the aerosol-generating system, may comprise a power supply, such as a battery. The power supply may be configured to supply power to the heating element. This may be to heat the heating element. The power supply may be configured to supply power to the heating element only when the cartridge is engaged with the aerosol-generating device.

The aerosol-generating device may comprise a controller. The controller may be configured to control supply of power from the power supply. Thus, the controller may control heating of the heating element.

The power supply may be configured to supply power to the heating element to resistively heat the heating element.

The power supply may be configured to supply power to the heating element to inductively heat the heating element.

The aerosol-generating device may be configured to engage with, and disengage from, the cartridge via a snap-fit connection, corresponding screw threads or any other suitable means. The aerosol-generating device may be configured to receive at least a portion of the cartridge. For example, the aerosol-generating device may comprise a chamber configured to receive at least a portion of the cartridge.

The aerosol-generating device may comprise an air inlet. The aerosol-generating device may comprise an air outlet. When the aerosol-generating device is engaged with the cartridge, the air outlet of the aerosol-generating device may be in fluid communication with the air inlet of the cartridge.

The power supply may be electrically connected to first and second electrical contacts of the device. These first and second electrical contacts may be configured to form an electrical connection with corresponding first and second electrical contacts on the cartridge when the cartridge is engaged with the device. These corresponding first and second electrical contacts on the cartridge may be electrically connected to the heating element. Thus, the power supply may be configured to supply power to the heating element by passing a current through the heating element.

According to another aspect of the present disclosure, there is provided a method for heating a liquid aerosol-forming substrate within a heater assembly for use in an aerosol-generating system. The heater assembly may comprise a liquid aerosol-forming substrate comprising at least two compounds, wherein the first compound may have a first boiling point and the second compound may have a second boiling point. The heater assembly may have a retention material containing the aerosol-forming substrate. A heating element may be configured to heat the retention material. The heating element may be formed from a band of material, wherein the cross-sectional area of the band of material may progressively decrease along a length of the band of material. The method may comprise passing a current along the length of the band of material, such that the heating element may provide a temperature gradient along a surface of the retention material.

Advantageously, this method may improve control of the vaporisation of the different compounds of the liquid aerosol-forming substrate. The method for heating a liquid aerosol-forming substrate may result in liquid aerosol-forming substrate compounds with higher boiling points and lower boiling points being vaporised simultaneously, at desirable rates. The method for heating a liquid aerosol-forming substrate may result in liquid aerosol-forming substrate compounds with higher boiling points and lower boiling points being vaporised in more preferable proportions. The heater assembly may provide generation of an aerosol with a more desirable composition. The heater assembly may provide more consistent generation of an aerosol with desirable properties.

The band of material may be folded on itself to provide at least one overlapping portion having a greater thickness and a lower electrical resistance than adjacent non-overlapping portions of the band of material. The band of material may have a progressively decreasing cross-sectional area along a length of the band of material. The width of the band of material may be progressively decreasing. Alternatively, or in addition, the thickness of the band of material may be progressively decreasing.

As explained above, the at least one overlapping portion may provide a portion of the band of material with a lower temperature than adjacent non-overlapping portions of the band of material. Advantageously, the band of material being folded on itself and the resulting at least one overlapping portion may create more areas of higher temperature, and more areas of lower temperature, along a surface of the retention material. Alternatively, or in addition, this may provide more areas which increase in temperature at a greater rate, and more areas which increase in temperature at a lesser rate, along a surface of the retention material. This may lead to liquid aerosol-forming substrate compounds with higher boiling points and lower boiling points being vaporised simultaneously at preferable rates. Advantageously, the production of a heating element formed from of a band of material that is folded on itself may allow a simple manufacturing process.

According to another aspect of the present disclosure, there is provided a heater assembly for use in an aerosol-generating system. The heater assembly may comprise a liquid aerosol-forming substrate comprising at least two compounds. wherein the first compound has a first boiling point and the second compound has a second boiling point; a retention material containing the aerosol-forming substrate; and a heating element configured to heat the retention material, wherein the heating element is formed from a band of material, wherein the band of material is folded on itself to provide at least one overlapping portion having a greater thickness and a lower electrical resistance than adjacent non-overlapping portions of the band of material, to provide a temperature gradient along a surface of the retention material.

As used herein, the term "aerosol" refers to a dispersion of solid particles, or liquid droplets, or a combination of solid particles and liquid droplets, in a gas. The aerosol may be visible or invisible. The aerosol may include vapours of substances that are ordinarily liquid or solid at room temperature as well as solid particles, or liquid droplets, or a combination of solid particles and liquid droplets.

As used herein, the term "aerosol-forming substrate" refers to a substrate capable of releasing volatile compounds that can form an aerosol. The volatile compounds may be released by heating or combusting the aerosol-forming substrate.

The aerosol-forming substrate may comprise a plurality of compounds. The compounds may have different boiling points. For example, the aerosol-forming substrate may comprise a first compound with a first boiling point at atmospheric pressure and a second compound with a second boiling point at atmospheric pressure, the first boiling point being greater than the second boiling point.

The aerosol-forming substrate may comprise an aerosol former. As used herein, the term "aerosol-former" refers to any suitable compound or mixture of compounds that, in use, facilitates formation of an aerosol, for example a stable aerosol that is substantially resistant to thermal degradation at the temperature of operation of the system. Suitable aerosol-formers are well known in the art and include, but are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate.

The aerosol-forming substrate may comprise nicotine. The aerosol-forming substrate may comprise water. The aerosol-forming substrate may comprise glycerol, also referred to as glycerine, which has a higher boiling point than nicotine. The aerosol-forming substrate may comprise plant-based material. The aerosol-forming substrate may comprise homogenised plant-based material. The aerosol-forming substrate may comprise tobacco. The aerosol-forming substrate may comprise a tobacco-containing material. The tobacco-containing material may contain volatile tobacco flavour compounds. These compounds may be released from the aerosol-forming substrate upon heating. The aerosol-forming substrate may comprise homogenised tobacco material. The aerosol-forming substrate may comprise other additives and ingredients, such as flavourants.

As used herein, the term "liquid aerosol-forming substrate" is used to refer to an aerosol-forming substrate in condensed form. Thus, the "liquid aerosol-forming substrate" may be, or may comprise, one or more of a liquid, gel, or paste. If the liquid aerosol-forming substrate is, or comprises, a gel or paste, the gel or paste may liquidise upon heating. For example, the gel or paste may liquidise upon heating to a temperature of less than 50, 75, 100, 150, or 200 degrees Celsius.

As used herein, the term "heating element" refers to an element of a heater, the element being configured to be heated. For example, the term "heating element" may refer to an element configured to be heated to at least 50, 100, 150, 200, 250, or 300 degrees Celsius. The heating element, or parts thereof, may be configured to be resistively heated.

As used herein "embedded" may be used to mean surrounded, enveloped, enclosed, circumscribed, or encircled.

As used herein, the term "length" refers to the major dimension in a longitudinal direction of an aerosol-generating system, or a component of the aerosol-generating system, such as a band of material used to form a heating element.

The boiling point of a liquid is the temperature at which the vapour pressure of a liquid equals the external pressure surrounding the liquid. As used herein, the term "boiling point" refers to the normal boiling point or atmospheric boiling point, which is the temperature at which the vapour pressure of the liquid equals the pressure at sea level (1 atmosphere).

As used herein, the term "transverse" refers to the direction that is perpendicular to the longitudinal axis at a particular location along its length. Any reference to the "cross-section" of the aerosol-generating system or a component of the aerosol-generating system, such as the heater assembly, or a component of the heating element, refers to the transverse cross-section unless stated otherwise.

The invention is defined in the claims. However, below there is provided a non-exhaustive list of non-limiting examples. Any one or more of the features of these examples may be combined with any one or more features of another example, embodiment, or aspect described herein.

Example Ex1: A heater assembly for use in an aerosol-generating system, the heater assembly comprising: a liquid aerosol-forming substrate comprising at least two compounds, wherein the first compound has a first boiling point and the second compound has a second boiling point; a retention material containing the liquid aerosol-forming substrate; and a heating element configured to heat the retention material by passing a current along the length of the heating element, wherein the heating element is formed from a band of material, wherein the cross-sectional area of the band of material progressively decreases along a length of the band of material to provide a temperature gradient along a surface of the retention material.

Example Ex2: A heater assembly according to example Ex1, wherein the band of material is folded on itself to provide at least one overlapping portion having a greater thickness and a lower electrical resistance than adjacent non-overlapping portions of the band of material.

Example Ex3: A heater assembly according to example Ex1 or Ex2, wherein the heating element comprises a first heating element material and a second heating element material, wherein the first heating element material is at a first position along a length of the band of material and the second heating element material is at a second position along a length of the band of material.

Example Ex4: A heater assembly according to example Ex3, wherein the first heating element material has a first electrical resistivity and a the second heating element material has a second electrical resistivity different to the first electrical resistivity.

Example Ex5: A heater assembly according to any of examples Ex1 to Ex4, comprising a plurality of heating elements.

Example Ex6: A heater assembly according to example Ex5, wherein at least one heating element provides a temperature gradient along a surface of the retention material.

Example Ex7: A heater assembly according to any one of examples Ex5 or Ex6, wherein a section of the retention material is enclosed, or partially enclosed in a volume defined between two heating elements.

Example Ex8: A heater assembly according to any of examples Ex1 to Ex7, wherein the heating element is in contact with the retention material.

Example Ex9: A heater assembly according to any of examples Ex1 to Ex8, wherein the heating element is configured to be resistively heated.

Example Ex10: A heater assembly according to any of examples Ex1 to Ex9, wherein the band of material is perforated.

Example Ex11: A heater assembly according to any of examples Ex1 to Ex9, wherein the band of material is a mesh.

Example Ex12: A heater assembly according to any of examples Ex1 to Ex11, wherein the retention material is a porous material.

Example Ex13: A heater assembly according to any of examples Ex1 to Ex12, wherein the retention material is a ceramic material.

Example Ex14: A heater assembly according to any of examples Ex1 to Ex13, wherein the retention material is a capillary retention material.

Example Ex15: A heater assembly according to any of examples Ex1 to Ex14, wherein the aerosol-forming substrate is absorbed in the retention material.

Example Ex16: A heater assembly according to any of examples Ex1 to Ex15, wherein a minimum cross-sectional area along a length of the band of material is at least 10% less than a maximum cross-sectional area along the length of the band of material.

Example Ex17: A heater assembly according to any of examples Ex1 to Ex16, wherein the boiling point of the first compound is between 240 degrees Celsius and 250 degrees Celsius. Example Ex18: A heater assembly according to any of examples Ex1 to Ex17, wherein the boiling point of the second compound is between 285 degrees Celsius and 295 degrees Celsius.

Example Ex19: A cartridge for use in an aerosol-generating system, the cartridge comprising the heater assembly of any of examples Ex1 to Ex18.

Example Ex20: A cartridge according to example Ex19, comprising an air inlet and an air outlet, wherein an air flow path is defined between the air inlet and the air outlet.

Example Ex21: A cartridge according to example Ex20, wherein air drawn from the air inlet to the air outlet flows across, past, or through the heating element.

Example Ex22: A cartridge according to example Ex21, wherein the air inlet is located closest to the portion of heating element with the substantially lowest electrical resistance.

Example Ex23: A cartridge according to examples Ex20 to Ex22, wherein the air outlet is located closest to the portion of heating element with the substantially highest electrical resistance.

Example Ex24: A cartridge according to any of examples Ex20 to Ex23, wherein air in the airflow path passes across a surface of the retention material.

Example Ex25: A cartridge according to any of examples Ex20 to Ex24, wherein the heater assembly provides a temperature gradient across the surface of the retention material.

Example Ex26: An aerosol-generating system comprising a heater assembly according to any preceding example.

Example Ex27: An aerosol-generating system according to example Ex26, comprising an air inlet and an air outlet, wherein an air flow path is defined between the air inlet and the air outlet.

Example Ex28: An aerosol-generating system according to example Ex27, wherein air drawn from the air inlet to the air outlet flows across, past, or through the heating element.

Example Ex29: An aerosol-generating system according to any of examples Ex27 or Ex28, wherein the air inlet is located closest to the portion of heating element with the substantially lowest electrical resistance.

Example Ex30: An aerosol-generating system according to any of examples Ex27 or Ex28, wherein the air flow path outlet is located closest to the portion of heating element with the substantially highest electrical resistance.

Example Ex31: An aerosol-generating system according to any of examples Ex26 to Ex30, wherein air in the airflow path passes across a surface of the retention material and the air flow path is in fluid contact with the aerosol-forming substrate.

Example Ex32: An aerosol-generating system according to any of examples Ex26 60 Ex31, wherein the heater assembly provides a temperature gradient across the surface of the retention material.

Example Ex33: An aerosol-generating system according to any of examples Ex27 to Ex32, comprising a mouthpiece at the air outlet.

Example Ex34: An aerosol-generating system according to any of examples Ex26 to Ex33, wherein the aerosol-generating system is an e-cigarette system.

Example Ex35: A method for heating an aerosol-forming substrate within a heater assembly for use in an aerosol-generating system, the heater assembly comprising: the liquid aerosol-forming substrate comprising at least two compounds, wherein the first compound has a first boiling point and the second compound has a second boiling point; a retention material containing the liquid aerosol-forming substrate; and a heating element configured to heat the retention material, wherein the heating element is formed from a band of material, wherein the cross-sectional area of the band of material progressively decreases along a length of the band of material; the method comprising passing a current along the length of the band of material, such that the heating element provides a temperature gradient along a surface of the retention material.

Example Ex36: A method according to example Ex35, wherein the band of material is folded on itself to provide at least one overlapping portion having a greater thickness and a lower electrical resistance than adjacent non-overlapping portions of the band of material.

Example Ex37: A heater assembly for use in an aerosol-generating system, the heater assembly comprising: a liquid aerosol-forming substrate comprising at least two compounds, wherein the first compound has a first boiling point and the second compound has a second boiling point; a retention material containing the aerosol-forming substrate; and a heating element configured to heat the retention material, wherein the heating element is formed from a band of material, wherein the band of material is folded on itself to provide at least one overlapping portion having a greater thickness and a lower electrical resistance than adjacent non-overlapping portions of the band of material, to provide a temperature gradient along a surface of the retention material.

Examples will now be further described with reference to the figures in which.

Figure 1:
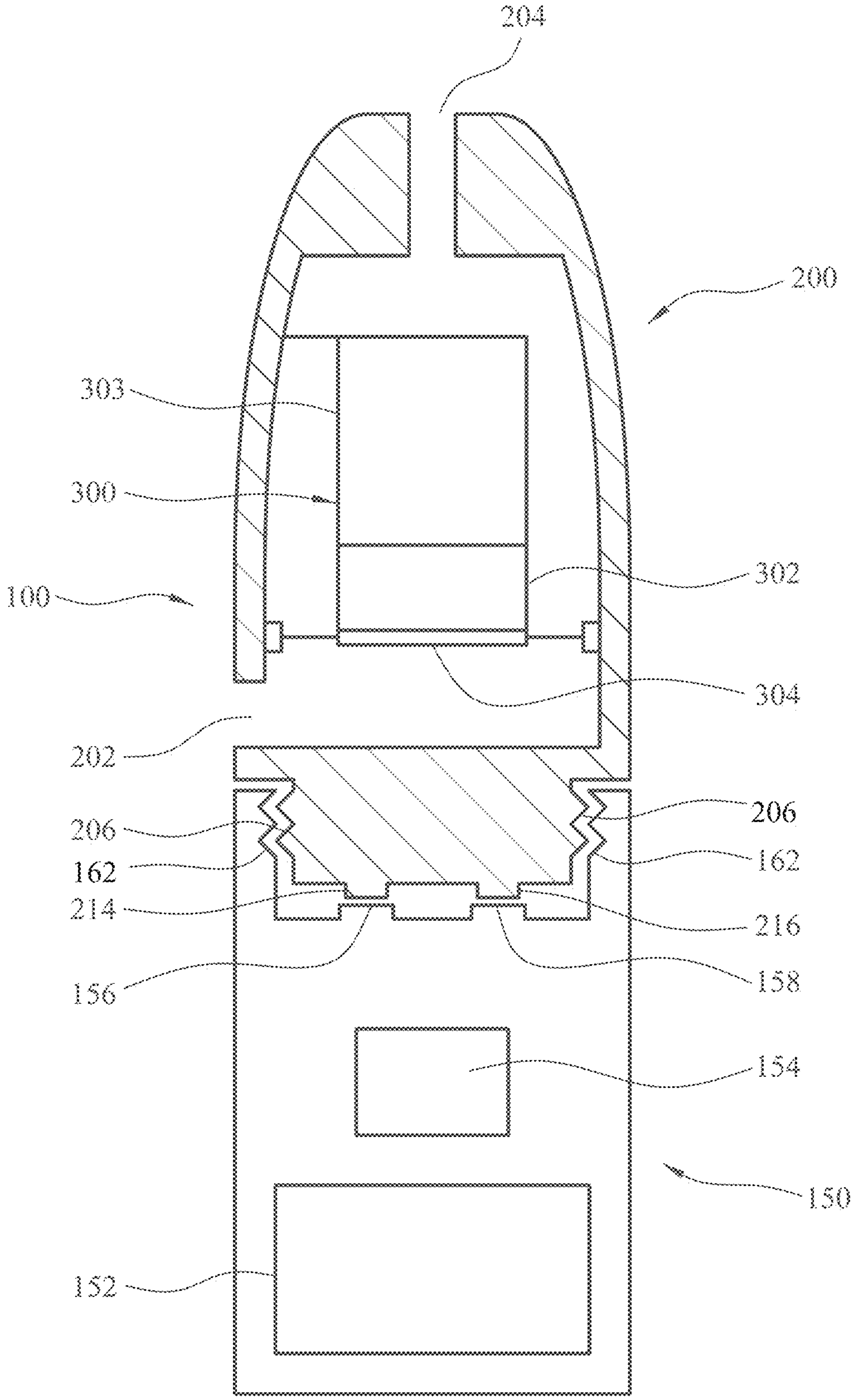
FIG. 1 shows a longitudinal cross-sectional view of a first aerosol-generating system comprising a cartridge comprising a first heater assembly.

FIG. 1 shows a longitudinal cross-sectional view of an aerosol-generating system 100. The aerosol-generating system 100 comprises an aerosol-generating device 150 and a cartridge 200. In this example, the aerosol-generating system 100 is an electrically operated smoking system, often referred to as an e-cigarette system.

The aerosol-generating device 150 is portable and has a size comparable to a conventional cigar or cigarette. The device 150 comprises a battery 152, such as a lithium iron phosphate battery, and a controller 154 electrically connected to the battery 152. The device 150 also comprises two electrical contacts 156, 158 which are electrically connected to the battery 152. This electrical connection is a wired connection and is not shown in FIG. 1.

The cartridge 200 comprises first and second electrical contacts 214, 216, an air inlet 202, an air outlet 204, and a heater assembly 300. An air flow path is defined between the air inlet 202 and the air outlet 204. The heater assembly 300 is positioned downstream of the air inlet 202 and upstream of the air outlet 204. The heater assembly 300 comprises a liquid aerosol-forming substrate, a retention material 302, and a reservoir 303 of liquid aerosol-forming substrate. The retention material 302 is in fluid communication with the reservoir 303 of liquid aerosol-forming substrate. The heater assembly 300 also comprises a heating element 304. The first and second electrical contacts 214, 216 are electrically connected to the heating element 304.

In this system 100, the liquid aerosol-forming substrate comprises around 74% by weight glycerine, 24% by weight propylene glycol, and 2% by weight nicotine, though any suitable substrate could be used. At atmospheric pressure, nicotine has a boiling point of around 247 degrees Celsius, glycerine has a boiling point of around 290 degrees Celsius and propylene glycol has a boing point of around 188 degrees Celsius. Thus, when initially heating this liquid aerosol-forming substrate to form an aerosol, some systems may undesirably vaporise a disproportionately large amount of propylene glycol (which has the lowest boiling point of the compounds forming the substrate). This may lead to a less desirable aerosol being delivered to the user, such as an aerosol comprising a smaller proportion of nicotine than desired. This may also undesirably change the relative proportions of the compounds in the substrate over a longer time period. The present invention may eliminate or at least reduce these undesirable effects.

The heating element 304 is configured to heat the retention material 302 by passing a current along the length of the heating element 304. The heating element 304 is formed from a band of material. The band of material has a cross-sectional area that progressively decreases along a length of the band of material. The decreasing cross-sectional area of the band of material provides a temperature gradient along a surface of the retention material 302.

In this example, the material is a mesh formed stainless steel. The band of material may be perforated.

The retention material 302 in this example is a porous ceramic capillary retention material, which comprises a number of pores. In FIG. 1, the aerosol-forming substrate is absorbed in the retention material 302. The aerosol-forming substrate is stored in the pores of the porous ceramic material.

The reservoir 303 of liquid aerosol-forming substrate, in this example comprises a capillary material that has a fibrous structure. In other embodiments a reservoir or tank of liquid aerosol-forming substrate could be used. The capillary material is formed from polyester.

The reservoir 303 of liquid aerosol-forming substrate may be adhered to the retention material 302 with glue, or may be held in place by friction, or may be held in place by another suitable means.

In FIG. 1, the aerosol-generating device 150 is engaged with the cartridge 200. In this example, the cartridge 200 is engaged with the aerosol-generating device 150 via a screw thread 206 of the cartridge 200 mated with a corresponding screw thread 162 of the aerosol-generating device 150.

In use, a user puffs on the air outlet 204 of the cartridge 200. At the same time, the user presses a button (not shown) on the aerosol-generating device 150. Pressing this button sends a signal to the controller 154, which results in power being supplied from the battery 152 to the heating element 304 via the electrical contacts 156, 158 of the device and the electrical contacts 214, 216 of the cartridge. This causes a current to flow through the heating element 304, thereby resistively heating the heating element 304. In other examples, an air flow sensor, or pressure sensor, is located in the cartridge 200 and electrically connected to the controller 154. The air flow sensor, or pressure sensor, detects that a user is puffing on the air outlet 204 of the cartridge 200 and sends a signal to the controller 154 to provide power to the heating element 304. In these examples, there is therefore no need for the user to press a button to heat the heating element 304.

As the heating element 304 is resistively heated, areas of higher temperature and areas of lower temperature are created along a surface of the retention material 302. Areas of lower temperature may be created in areas where the band of material, from which the heating element 304 is formed, has a larger cross sectional area. The creation of areas of higher temperature and areas of lower temperature causes compounds of the liquid aerosol-forming substrate with higher boiling points and lower boiling points in the retention material 302 to be vaporised simultaneously. In this example, although not shown in FIG. 1, the air inlet is located closed to the portion of the heating element with the substantially lowest electrical resistance. The air outlet is located closest to the portion of heating element with substantially highest electrical resistance.

As the user puffs on the air outlet 204 of the cartridge 200, air is drawn into the air inlet 202. This air then travels across the heater assembly 300, across a surface of the retention material 302, and towards the air outlet 204. This flow of air entrains the vapour formed by heating liquid aerosol-forming substrate in the retention material 302 by the heating element 304. This entrained vapour then cools and condenses to form an aerosol. This aerosol is then delivered to the user via the air outlet 204. As liquid aerosol-forming substrate in the retention material 302 is heated, vaporised, and entrained in the air flow, liquid aerosol-forming substrate from the reservoir 303 travels into the retention material 302. This aerosol-forming substrate from the reservoir 303 effectively replaces the vaporised aerosol-forming substrate. The liquid aerosol-forming substrate from the reservoir 303 may be drawn into the retention material 302, at least partly, by capillary action. This is because the retention material 302 is a capillary material having a fibrous or spongy structure.

Figure 2:
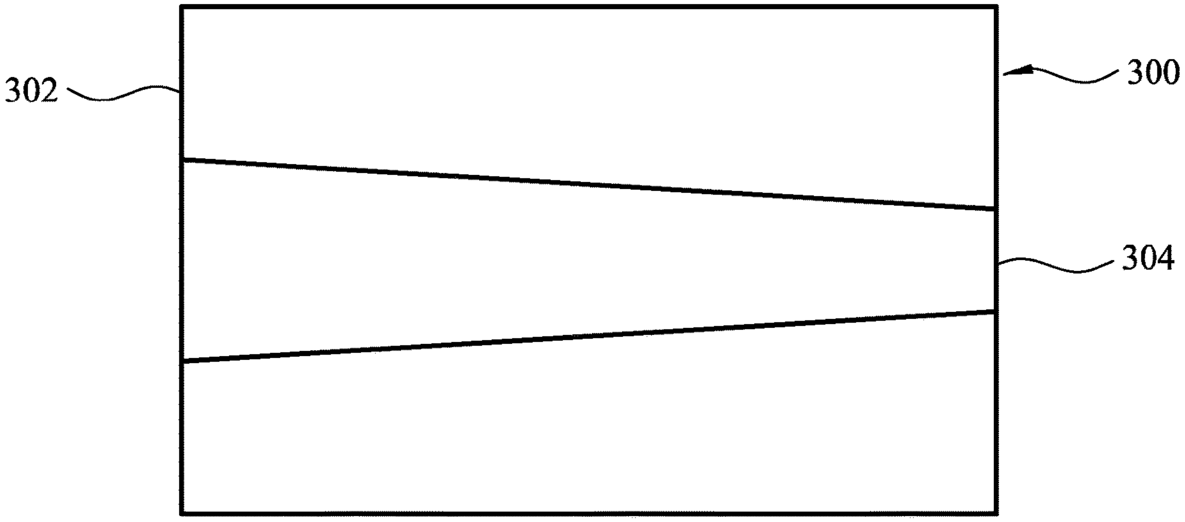
FIG. 2 shows a cross-sectional view of the first heater assembly.

FIG. 2 shows a cross-sectional view the heater assembly 300. The heating element 304 is formed from a band of material. The cross sectional area of the band of material progressively decreases along a length of the band of material to provide a temperature gradient long a surface of the material. The heating element 304 is electrically connected to electrical contacts not shown in FIG. 2, which are configured to supply power to resistively heat the heating element 304. In FIG. 2, the width of the band of material of the heating element 304 progressively decreases. The minimum width of the heating element 304 is about 50 percent of the maximum width of the heating element. Thus, the electrical resistance of the heating element increases as the width of the band of material decreases, to provide a temperature gradient along a surface of the retention material 302.

Figure 3:
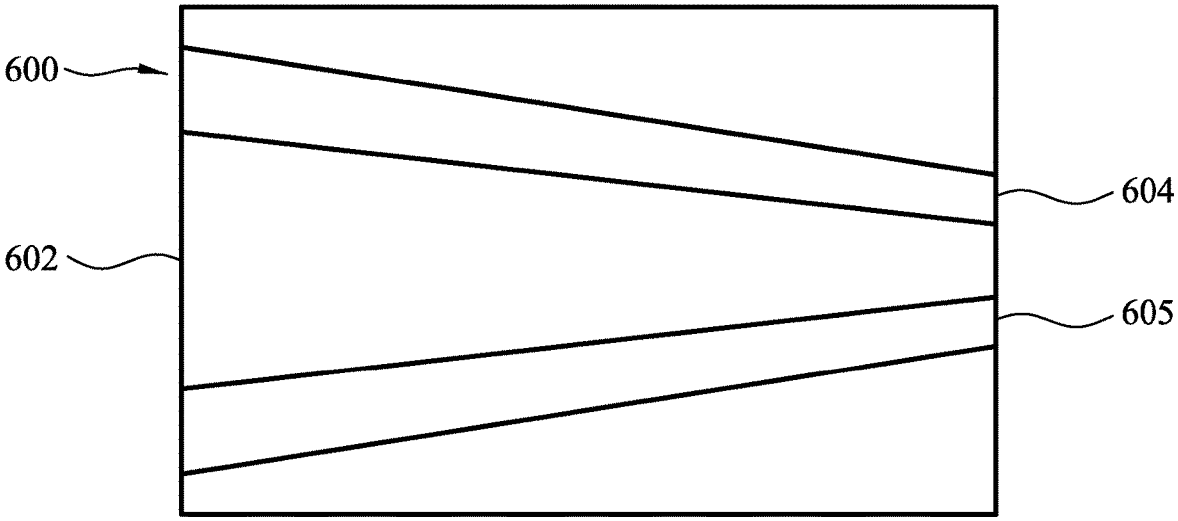
FIG. 3 shows a cross-sectional view of a second first heater assembly.

FIG. 3 shows cross-sectional view of a second heater assembly 600. The heating elements 604, 605 are formed from bands of material. The heating elements 604, 605 are configured to heat the retention material 602. In use, a current is passed along the length of the heating elements 604, 605. The heating elements 604 and 605 are each formed from band of material. The bands of material have cross-sectional areas that progressively decrease along a length of the bands of material. The decreasing cross-sectional areas of the bands of material provide a temperature gradient along a surface of the retention material 602. The heating elements 604, 605 are partially embedded within the retention material 602. Therefore, a section of the retention material 602 is partially enclosed in a volume defined between two heating elements 604, 605. The heating elements 604, 605 are electrically connected to electrical contacts not shown in FIG. 3, which are configured to supply power to resistively heat the heating elements 604, 605. As the heating elements 604, 605 are resistively heated, areas of higher temperature and areas of lower temperature are created in the retention material 602. Areas of lower temperature may be created in areas where the bands of material, from which the heating elements 604, 605 are formed, have a larger cross sectional area. In addition, because section of the retention material 602 is enclosed in a volume defined between two heating elements 604, 605, the heating elements are positioned to further increase the temperature gradient, as required. For example, in FIG. 3, the heating elements 604, 605 are positioned such that the areas of bands of material with the smallest cross-sectional area are positioned closer together than the end of the bands of material with a larger cross-sectional area. This provides an increased temperature gradient across a surface of the retention material 602.

The creation of areas of higher temperature and areas of lower temperature causes compounds of the liquid aerosol-forming substrate with higher boiling points and lower boiling points in the liquid aerosol-forming substrate storage component 602 to be vaporised simultaneously.

Figure 4:
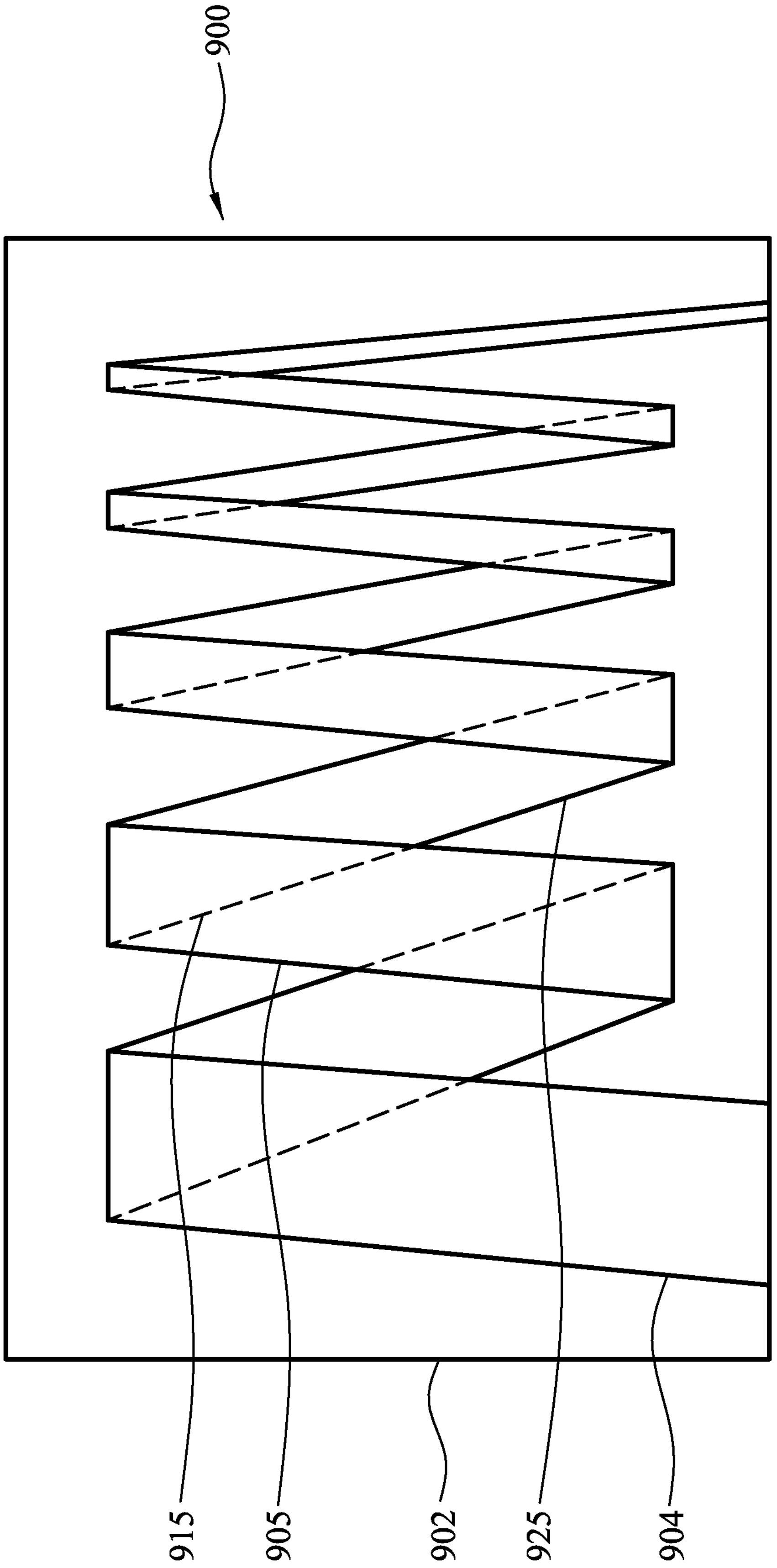
FIG. 4 shows a cross-sectional view of a third heater assembly.

FIG. 4 shows a cross-sectional view of a fourth heater assembly 900. The heating element 904 is formed from a band of material. The band of material is folded on itself to provide at least one overlapping portion of band of material. This provides a portion of heating element having a greater thickness 915 than the adjacent portions of the heating element 905, 925. The portion of heating element having a greater thickness 915, also has a lower electrical resistance than adjacent non-overlapping portions of the band of material 905, 925. The heating element 904 is electrically connected to electrical contacts not shown in FIG. 4, which are configured to supply power to resistively heat the heating element 904. In use, the portion of heating element with a lower electrical resistance 915 is at a lower temperature and therefore provides less heat to the retention material than the adjacent non-overlapping portions of retention material 905, 925. As a result the heating element 904 provides a temperature gradient to along the surface of the retention material 902. Portions of low temperature along the retention material correspond to portions of heating element having a greater thickness 915.

Additionally, the band of material of FIG. 4 has a progressively decreasing cross-sectional area along a length of the band of material. The width of the band of material is progressively decreasing, providing a temperature gradient along the length of the band of material. There are 9 portions of the band of material in FIG. 4 that are overlapping, although any number of overlapping portions may be selected. As a result, the heating element does not have a progressively decreasing cross-sectional area.

For the purpose of the present description and of the appended claims, except where otherwise indicated, all numbers expressing amounts, quantities, percentages, and so forth, are to be understood as being modified in all instances by the term "about". Also, all ranges include the maximum and minimum points disclosed and include any intermediate ranges therein, which may or may not be specifically enumerated herein. In this context, therefore, a number A is understood as A±10 percent of A. Within this context, a number A may be considered to include numerical values that are within general standard error for the measurement of the property that the number A modifies. The number A, in some instances as used in the appended claims, may deviate by the percentages enumerated above provided that the amount by which A deviates does not materially affect the basic and novel characteristic(s) of the claimed invention. Also, all ranges include the maximum and minimum points disclosed and include any intermediate ranges therein, which may or may not be specifically enumerated herein.

The invention claimed is:

1. A heater assembly for an aerosol-generating system, the heater assembly comprising:

a liquid aerosol-forming substrate comprising at least two compounds, wherein the first compound has a first boiling point and the second compound has a second boiling point;

a retention material containing the liquid aerosol-forming substrate; and a heating element configured to heat the retention material by passing a current along a length of the heating element, wherein the heating element is formed from a band of material, and wherein a cross-sectional area of the band of material progressively decreases along a length of the band of material from a maximum cross-sectional area of the band of material at a first end of the band of material to a minimum cross-sectional area of the band of material at a second end of the band of material, to provide a temperature gradient along a surface of the retention material.

2. The heater assembly according to claim 1, wherein the band of material is folded on itself to provide at least one overlapping portion having a greater thickness and a lower electrical resistance than adjacent non-overlapping portions of the band of material.

3. The heater assembly according to claim 1, wherein the heating element comprises a first heating element material and a second heating element material, wherein the first heating element material is at a first position along a length of the band of material and the second heating element material is at a second position along the length of the band of material, and wherein the first heating element material has a first electrical resistivity and the second heating element material has a second electrical resistivity different from the first electrical resistivity.

4. The heater assembly according to claim 1, further comprising a plurality of heating elements, wherein at least one heating element of the plurality of heating elements provides a temperature gradient along a surface of the retention material.

5. The heater assembly according to claim 1, wherein the band of material is perforated or a mesh.

6. The heater assembly according to claim 1, wherein the retention material is a porous ceramic capillary retention material.

7. A cartridge for an aerosol-generating system, the cartridge comprising the heater assembly according to claim 1.

8. The cartridge according to claim 7, further comprising an air inlet and an air outlet, wherein an air flow path is defined between the air inlet and the air outlet, and wherein air drawn from the air inlet to the air outlet flows across, past, or through the heating element.

9. The cartridge according to claim 8, wherein the air inlet is located closest to a portion of the heating element with a lowest electrical resistance and the air outlet is located closest to a portion of the heating element with a highest electrical resistance.

10. An aerosol-generating system comprising the heater assembly according to claim 1.

11. The aerosol-generating system according to claim 10, further comprising an air inlet and an air outlet, wherein an air flow path is defined between the air inlet and the air outlet, and wherein air drawn from the air inlet to the air outlet flows across, past, or through the heating element.

12. The aerosol-generating system according to claim 11, wherein the air inlet is located closest to a portion of the heating element with a lowest electrical resistance, and wherein the air outlet is located closest to a portion of the heating element with a highest electrical resistance.

13. The aerosol-generating system according to claim 11, wherein air in the air flow path passes across the surface of the retention material and the air flow path is in fluid contact with the aerosol-forming substrate.

14. A method for heating an aerosol-forming substrate within a heater assembly for an aerosol-generating system, the heater assembly comprising:

a liquid aerosol-forming substrate comprising at least two compounds, wherein the first compound has a first boiling point and the second compound has a second boiling point, a retention material containing the aerosol-forming substrate, and a heating element configured to heat the retention material, wherein the heating element is formed from a band of material, wherein a cross-sectional area of the band of material progressively decreases along a length of the band of material; and the method comprising passing a current along the length of the band of material, such that the heating element provides a temperature gradient along a surface of the retention material.

15. The method according to claim 14, wherein the band of material is folded on itself to provide at least one overlapping portion having a greater thickness and a lower electrical resistance than adjacent non-overlapping portions of the band of material.

* * * * *